B. SPITZFADEN.
DOOR HANGER.
APPLICATION FILED FEB. 4, 1919.

1,348,758. Patented Aug. 3, 1920.

WITNESSES
Edw. Thorpe

INVENTOR
Bernhard Spitzfaden
BY
ATTORNEYS

UNITED STATES PATENT OFFICE.

BERNHARD SPITZFADEN, OF BROOKLYN, NEW YORK.

DOOR-HANGER.

1,348,758. Specification of Letters Patent. Patented Aug. 3, 1920.

Application filed February 4, 1919. Serial No. 274,959.

*To all whom it may concern:*

Be it known that I, BERNHARD SPITZ-FADEN, a citizen of the United States, and a resident of the city of New York, borough of Brooklyn, in the county of Kings and State of New York, have invented a new and Improved Door-Hanger, of which the following is a description.

My invention relates to door hangers and more particularly to a ball bearing hanger for heavy doors. The hangers of a heavy door are subjected to very severe strains at the bearings.

The general object of my invention is to meet the severe conditions by providing a construction and arrangement of the parts that will resist the strains and at the same time will maintain the door in proper alinement against all tendency of the parts to become loose or displaced.

I have for a more specific object to embody the invention in an exceedingly simple and durable form.

Reference is to be had to the accompanying drawings forming a part of this specification, it being understood that the drawings are merely illustrative of one example of the invention.

Figure 1:
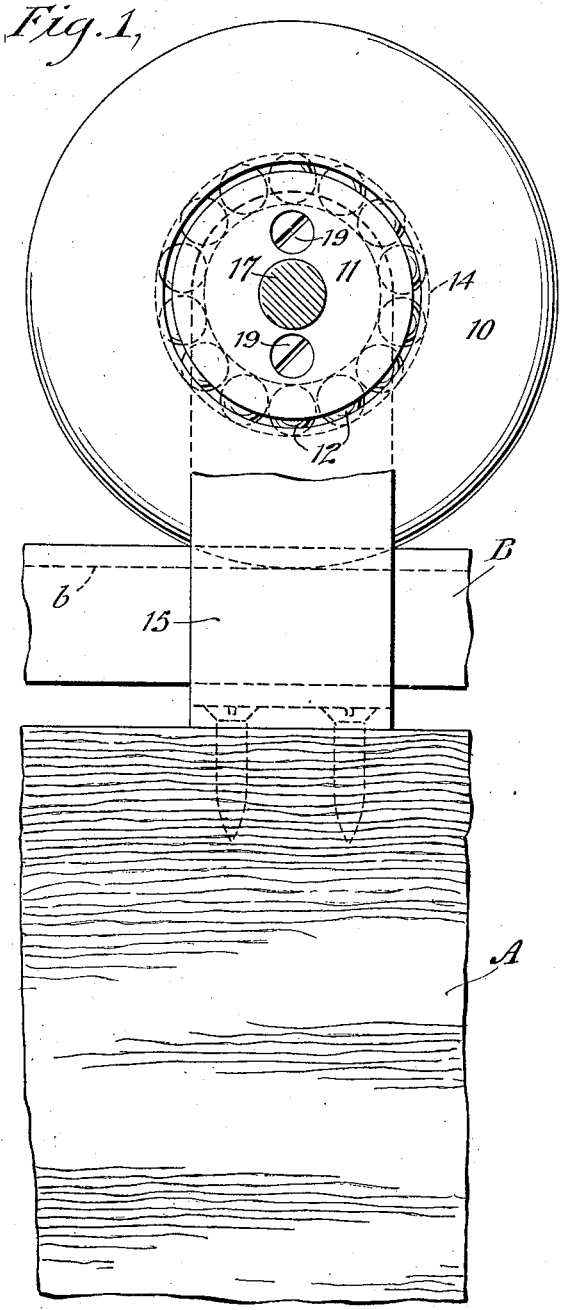
Figure 1 is a side elevation of a door hanger embodying my invention, partly broken away and partly in section, the view including portions of a door and track.
Figure 2:
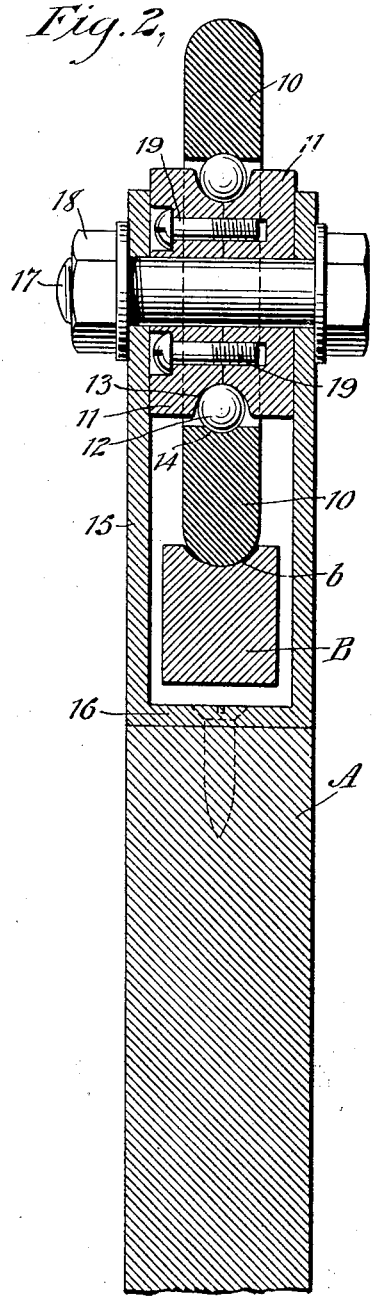
Fig. 2 is a transverse vertical section thereof.

In the drawing A indicates a fragment of a door and B, the track above the same on which the door hanger runs. Said hanger includes a centrally disposed wheel 10 advantageously having a transversely round periphery to run in the groove or channel *b* of the track. Within the wheel 10 is a hub 11 divided into two similar side sections meeting at the center of the wheel 10 in the plane of the latter. Ball bearings 12 run in a race formed jointly by an annular groove 13 in the hub 11 at the center and a shallower angular groove 14 in the wheel 10 at the interior. The channel 13 is formed party in one hub section and partly in the other hub section, and said sections contact at their opposed faces so that the channel presents no opening or broken surface at the joint between the sections. The wheel 10 and hub 11 with the ball bearings 12 are accommodated in a strap or U-shaped bracket 15, the base 16 of which is secured by screws or other suitable fasteners to the top of the door A so that the hanger is in the plane of the door and the sides of the bracket are spaced to snugly receive the hub 11 which is of a length to project materially beyond the wheel 10 at each side. Thus, the wheel runs freely and has ample clearance between the opposite sides of the bracket while the sides of the bracket lie against the opposite ends of the hub. A transverse bolt 17 extends axially through both sections of the hub 11 and through the sides of the bracket 15 so that the nut 18 of said bolt will tend to maintain the sides of the bracket close to the sides of the hub. The sectional form of the hub is for the purpose of assembling the hub, wheel and ball bearings and the race groove 13 is relatively of much greater depth than that of the race groove 14. The grooves 13 are in fact of a depth to accommodate the balls for more than half the periphery thereof, the arrangement facilitating the assemblage of the parts, since in assembling the hub may be partially entered in the wheel and the balls then placed in the groove 13 adjacent to a face of the wheel or partially within the latter and with all the balls in position, the hub is then completely entered in its position with the wheel and bearings centrally of the hub.

The described arrangement of the ball bearings in the plane of the wheel 10 and centrally of the wheel and hub is advantageous in centering the load and balancing the door as well as insuring a free running of the wheel. The construction, however, subjects the hub and the hanger generally to a severe spreading strain, the spreading strain being exerted on the hub directly at the median line or joint thereof and the hanger is equipped in two respects to resist the spreading strain. First, I provide transverse screws or equivalent fastening elements 19 at opposite sides of the bolt 17 and thus diametrically opposite each other, said fasteners extending through one section of the hub 11 and into the other. Thus, the spreading force is rigidly resisted at its inception, that is to say, directly at the hub, and at diametrically opposite points, but reliance is not placed solely on the screws 19 since the bolt 17 and its nut 18 maintain the sides of the bracket 15 tight against the hub 11, so that the said hub does not rotate and no space is provided in which the sections could spead.

I would state in conclusion that while the illustrated example constitutes a practical embodiment of my invention, I do not limit myself strictly to the mechanical details herein illustrated, since manifastly the same can be considerably varied without departure from the spirit of the invention as defined in the appended claim.

Having thus described my invention, I claim as new, and desire to secure by Letters Patent:

A door hanger, comprising a bracket having spaced parallel members and adapted to be secured to a door, a hub formed of sections contacting at the median line of the hub, said hub being of a thickness equal to the distance between the members of the bracket, the sections of the hub being recessed at their contacting faces to form a peripheral annular groove or ball race at the center of the thickness of the hub, screws securing the sections of the hub together, a wheel mounted on the hub and having an interior annular groove or ball race at the center of the thickness of the same, the ball race in the hub being deeper than that in the wheel, balls in said ball races, and a bolt passing through the members of the bracket and the hub and clasping the said members against the hub to prevent the same from turning.

BERNHARD SPITZFADEN.